United States Patent [19]
Skinner et al.

[11] 4,428,061
[45] Jan. 24, 1984

[54] METHOD AND APPARATUS FOR RECEIVING CARRIER-BORNE DIGITAL SIGNALS INTENDED TO OPERATE REMOTELY-OPERABLE SWITCHING DEVICES

[75] Inventors: Michael J. Skinner, Fleet; Jack Woollven, Camberley; Eric Metcalf, Alresford; Howard A. Dorey, Godalming, all of England

[73] Assignee: Sangamo Weston Limited, Enfield, England

[21] Appl. No.: 234,533

[22] Filed: Feb. 17, 1981

[30] Foreign Application Priority Data

Feb. 18, 1980 [GB] United Kingdom ............... 8005455

[51] Int. Cl.³ .................. G06F 15/34; H04L 27/18; H04L 27/22
[52] U.S. Cl. ................................. 364/728; 375/81; 375/87; 375/96
[58] Field of Search .............. 369/728; 375/81, 84, 375/87, 94, 96, 120; 455/38

[56] References Cited

U.S. PATENT DOCUMENTS

| | | | |
|---|---|---|---|
| 4,007,330 | 2/1977 | Winters | 364/728 X |
| 4,030,033 | 6/1977 | Bibl et al. | 375/96 X |
| 4,045,796 | 8/1977 | Kline, Jr. | 375/87 X |
| 4,053,836 | 10/1977 | Fellrath | 375/81 |
| 4,166,979 | 9/1979 | Waggener | 375/120 |
| 4,168,529 | 9/1979 | Tomlinson | 364/728 |
| 4,185,172 | 1/1980 | Melindo et al. | 364/728 X |

FOREIGN PATENT DOCUMENTS

| | | |
|---|---|---|
| 251090 | 12/1966 | Austria . |
| 251091 | 12/1966 | Austria . |
| 2420649 | 5/1977 | Fed. Rep. of Germany . |
| 2553303 | 3/1979 | Fed. Rep. of Germany . |
| 1145679 | 3/1969 | United Kingdom . |
| 1372643 | 11/1974 | United Kingdom . |
| 1519058 | 7/1978 | United Kingdom . |
| 2018065 | 10/1979 | United Kingdom . |

OTHER PUBLICATIONS

P. Bylanski and D. G. W. Ingram, *Digital Transmission Systems*, revised 2nd Edition, Published 1976, England, pp. 207–269 of interest.

Andrew S. Viterbi, *McGraw-Hill Series in Systems Science, Principles of Coherent Communication*, Published 1966, pp. 185–293 of interest.

*Primary Examiner*—Felix D. Gruber
*Attorney, Agent, or Firm*—Dale Gaudier

[57] ABSTRACT

A receiver, for receiving a signal comprising a carrier signal modulated with a digital signal, comprises a circuit for demodulating the received signal to produce an output signal which contains the digital signal. Because of repeated filtering, the digital signal is typically in the form of an approximately sinusoidal signal, which has a component whose frequency is equal to half the basic bit rate of the digital signal: because of noise, this component is subject to considerable timing jitter. To overcome this, the output signal is digitized and applied to a digital correlator, where it is correlated with a reference signal whose frequency is also equal to half the basic bit rate of the digital signal. The reference signal is preferably derived from a phase-locked loop locked to the carrier frequency. The correlator, which is constituted by a microprocessor, determines the instants of time which most nearly coincide with the mean-level crossing points of said component (which instants correspond to transitions between one bit of the digital signal and the next), and also determines successive bit values on the basis of the coincidence determination. The receiver can be used to receive mains-borne signals, i.e. signals transmitted over an electrical power supply network, or radio broadcast signals.

29 Claims, 7 Drawing Figures

METHOD AND APPARATUS FOR RECEIVING CARRIER-BORNE DIGITAL SIGNALS INTENDED TO OPERATE REMOTELY-OPERABLE SWITCHING DEVICES

This invention relates to receivers for receiving signals comprising a carrier signal modulated with a digital signal. The invention is more particularly but not exclusively concerned with such receivers intended for use in remotely-operably switching devices. The modulated carrier signals may typically be mains-borne signals, that is signals transmitted over the wires of an electrical power distribution network by suitably modulating the supply voltage of the network with the modulated carried signal, or radio broadcast signals.

In the United Kingdom, it is currently being proposed that such functions as tariff-switching and load-shedding in electrical power distribution networks should be effected by means of radio-controlled switching devices connected in the power distribution circuits of individual consumers, e.g. in the consumers' electricity meters for tariff-switching and in or near the meters for load-shedding. The proposal envisages that the switching devices could be controlled from a single transmitter, e.g. the British Broadcasting Corporation's Droitwich transmitter, which would broadcast suitable control signals capable of being received over practically the whole of the United Kingdom. The control signals would be constituted by a digital signal, typically a 50 baud digital signal, carried by a long wave carrier signal, typically the 200 kHz Radio 4 signal.

However, the signal strength of the broadcast signal, as received by the radio receivers in the switching devices, will vary enormously, not only in dependence upon the location of the switching device within the United Kingdom, but also as a function of the position of the switching device within the building in which it is installed (e.g. whether it is in a basement, or near a null-point in metal-framed building). This makes the reliable detection and decoding of the digital signal extremely difficult.

It has also been proposed that such functions as tariff-switching, load-shedding and remote meter reading in electrical power distribution networks should be effected by mains-borne signals of the kind mentioned above.

However, due to noise and other problems, the reliable detection and decoding of the digital signal in the mains-borne control signal is again extremely difficult.

It is therefore an object of the present invention to provide a receiver for receiving a carrier signal modulated with a digital signal, in which the abovementioned dificulty in detecting and decoding the digital signal is alleviated.

SUMMARY OF THE INVENTION

According to the present invention, there is provided an apparatus and method for receiving a signal comprising a radio frequency carrier signal of frequency $f_1$ modulated with a digital signal of known, relatively low bit rate. More particularly, the inventive apparatus comprises a receiver having an input circuit for receiving the modulated carrier signal, demodulator means connected to receive and demodulate the signal received by the input circuit, so as to produce an output signal which contains the digital signal, and local oscillator means for producing a series of N reference signals whose frequency is half the known bit rate. Each successive signal in the series produced by the local oscillator means has a different phase difference with respect to the first signal of the series and correlator means are provided to correlate each reference signal with the output signal produced by the demodulator means in order to identify which of the reference signals in most nearly in phase with the bits of the digital signal, with the correlator means being arranged to determine the values of successive bits of the digital signal by correlating the reference signal thus identified with the output signal.

The inventive method comprises the steps of (a) receiving the modulated carrier signal, (b) demodulating the received modulated carrier signal so as to produce an output signal which contains said digital signal, (c) producing a series of N reference signals whose frequency is half said known bit rate, each successive signal in the series having a different phase difference with respect to the first signal of the series, and (d) correlating each reference signal produced in step (c) with the output signal produced in step (b) so as to identify which of said reference signals is most nearly in phase with the bits of the digital signal, and determining the values of successive bits of the digital signal by correlating the reference signal thus identified with said output signal.

BRIEF DESCRIPTION OF THE DRAWING FIGURES

The invention will now be described, by way of example only, with reference to the accompanying drawings, of which.

DESCRIPTION OF THE PREFERRED EMBODIMENT

Figures 1, 2:
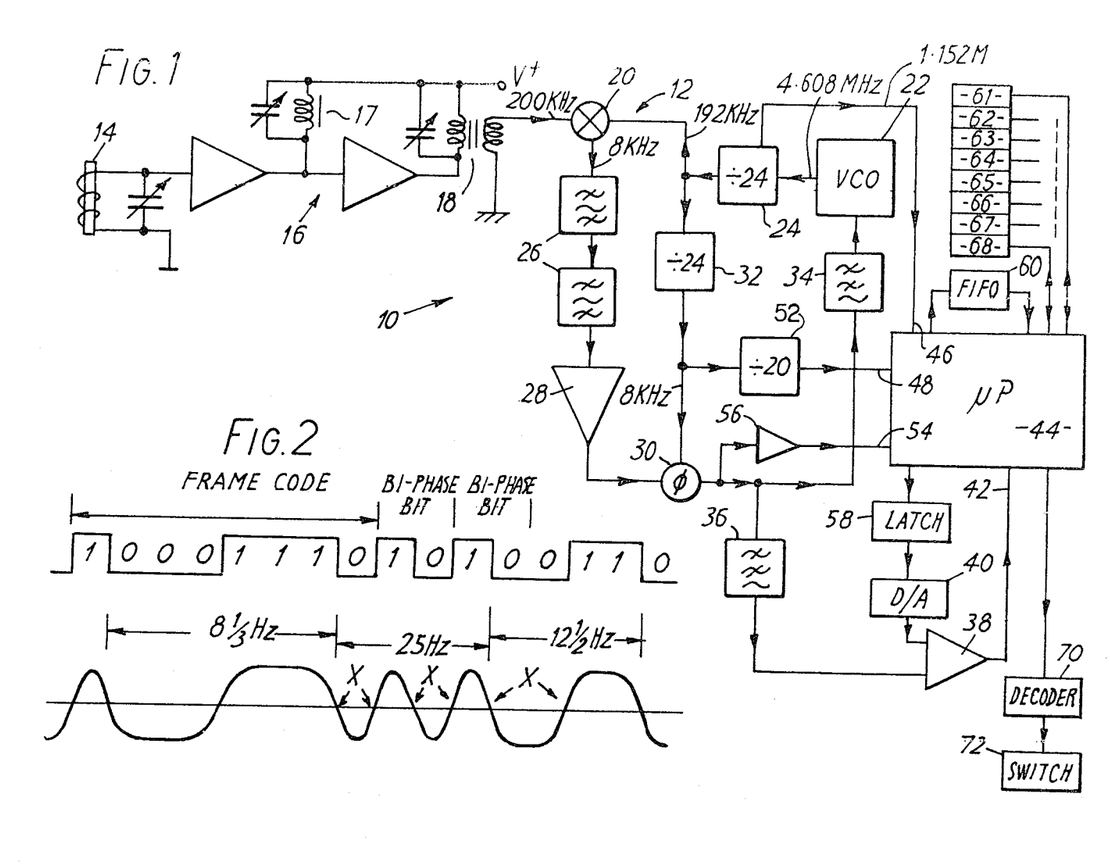
FIG. 1 is a simplified block circuit diagram of a radio-controlled switch incorporating a radio receiver in accordance with the present invention.
FIG. 2 shows examples of waveforms appearing at various points in the receiver of FIG. 1.

The radio-controlled switching device of FIG. 1 is indicated generally at 10, and comprises a radio receiver 12 for receiving a broadcast signal comprising a 200 kHz carrier signal modulated with a 50 baud digital signal in Manchester code: it will be appreciated that this frequency, bit-rate and code are exemplary only.

The receiver 12 comprises a conventional ferrite-rod aerial 14 for picking up the broadcast signal, and a conventional RF amplifier stage 16, tuned to 200 kHz by two tuned circuits 17,18, for amplifying the 200 kHz signal picked up by the aerial 14 and applying it to one input of a mixer 20. The other input of the mixer 20 is connected to receive a 192 kHz signal derived from a 4.608 MHz voltage-controlled oscillator 22 via a frequency divider 24 having a division ratio of twenty four. The mixer 20 thus produces an intermediate frequency signal whose frequency is equal to the difference between 200 kHz and 192 kHz, viz 8 kHz.

The intermediate frequency signal produced by the mixer 20, which signal is still modulated with the aforementioned digital signal, is amplified in a two-stage IF amplifier 26 tuned to 8 kHz and squared (ie amplitude-limited) in a slicer (or squaring amplifier) 28 before being applied to one input of a phase detector (or phase comparator) 30. The other input of the phase detector 30 is connected to receive another 8 kHz signal, which is derived from the 192 kHz signal at the output of the frequency divider 24 via another frequency divider 32 also having a division ratio of twenty-four.

The output signal produced by the phase detector 30 includes, in addition to the aforementioned digital signal, a DC component whose magnitude is dependent upon the phase difference, and thus the frequency difference, between the respective 8 kHz signals at its inputs. This output signal is applied, via a low pass filter 34 having an upper cut-off frequency of about 0.2 Hz, to the control input of the oscillator 22, where it varies the operating frequency of the oscillator in the sense which tends to reduce the frequency difference between the respective 8 kHz signals at the inputs of the phase detector 30.

Thus the mixer 20, the amplifier 26, the slicer 28, the frequency dividers 24, 32, the phase detector 30, the filter 34 and the oscillator 22 together form a kind of phase-locked loop which operates to lock the frequency of the oscillator 22 to the frequency of the 200 kHz carrier signal in the broadcast signal. Any change in the oscillator frequency from 4.608 MHz has a double effect on this phase-locked loop. For example, if the oscillator frequency increases, the respective frequencies produced by the frequency dividers 24 and 32 also increase, but the frequency of the respective signals produced by the mixer 20 and the slicer 28 decreases: however, if the oscillator frequency decreases, the respective frequencies produced by the frequency dividers 24, 32 also decrease, but the frequency of the respective signals produced by the mixer 20 and the slicer 28 increases. This arrangement increases the sensitivity and speed of response of the phase-locked loop. The oscillator 22 is preferably a variable-frequency crystal controlled oscillator.

As already mentioned, the output signal produced by the phase detector 30 includes the digital signal with which the 200 kHz carrier signal of the broadcast signal is modulated. To separate out the digital signal, this output signal is applied to a three-pole Butterworth filter 36.

Each original digital signal modulated onto the 200 kHz carrier signal typically comprises a "frame" of 100 bits, made up of:

(i) an 8-bit start-of-frame code;
(ii) 72 bits constituting 36 biphase bits of data (6 data words each comprising 6 bi-phase bits, in which a logic 1 is represented by a pair of bits 1,0 while a logic 0 is represented by a pair of bits 0,1, pairs of bits 0,0 and 1,1 being invalid as data); and
(iii) 20 bits constituting 10 bi-phase bits of cyclic redundancy code (CRC), used for checking the validity of data.

The bit (or clock) rate of the digital signal is locked to the 200 kHz frequency of the carrier signal, and each frame is broadcast repeatedly, successive frames being contiguous (i.e. having no interval between them).

However, the version of the digital signal appearing at the output of the Butterworth filter 36 has been heavily filtered, and can also be heavily noise-contaminated, particularly in poor reception areas. Consequently, this version of the digital signal has the appearance of an approximately sinusoidal analogue signal, whose frequency appears to be 25 Hz over significant groups of the bi-phase data bits, and integral submultiples of 25 Hz (e.g. $12\frac{1}{2}$ Hz, $8\frac{1}{3}$ Hz) elsewhere, as shown in FIG. 2. It will be appreciated that each half cycle of the 25 Hz component of this approximately sinusoidal signal corresponds to a bit of the original digital signal, with positive half cycles typically representing a 1 bit and negative half cycles typically representing a 0 bit. However, the approximately sinusoidal signal has a D.C. offset, and the noise contaminating it produces considerable timing jitter. It can therefore be extremely difficult to determine where one bit of the digital signal represented by the approximately sinusoidal signal ends and the next bit begins.

To overcome this difficulty, the signal appearing at the output of the Butterworth filter 36 is first sampled and digitised by means of a 6-bit microprocessor-controlled analogue-to-digital converter, and then digitally cross-correlated with a digital approximation of a 25 Hz reference sine wave which is effectively locked to the 200 kHz carrier signal of the received broadcast signal.

Digitisation is achieved by applying the signal at the output of the Butterworth filter 36 to one input of a comparator 38, whose other input is connected to the output of a digital-to-analogue converter 40 and whose output is connected to a control input 42 of a microprocessor 44. The microprocessor 44, which may typically be a type CDP 1802 microprocessor as manufactured and sold by RCA, has a clock input 46 and an interrupt input 48. The clock input 46 is connected to receive a 1.152 MHz clock signal derived from the oscillator 22 via a divide-by-four frequency divider (not shown) forming part of the divider 24, while the interrupt input 48 is connected to receive a 400 Hz signal derived from the 8 kHz signal appearing at the output of the frequency divider 32 via a divide-by-twenty frequency divider 52. The microprocessor 44 also has an input 54 connected to receive a "carrier present" signal, which is produced by an amplifier 56 when the phase detector 30 indicates that the phase-locked loop has achieved lock.

Each time the microprocessor 44 receives a pulse of the 400 Hz signal at its interrupt input 48, ie every $2\frac{1}{2}$ milliseconds, it commences an analogue-to-digital conversion cycle in which it successively enters bits of decreasing significance into a 6-bit latch 58, whose outputs are coupled to the digital inputs of the digital-to-analogue converter 40. This process continues until the level of the output of the converter 40 exceeds the instantaneous level of the signal at the output of the Butterworth filter 36, whereupon the comparator 38 produces an output signal which causes the microprocessor 44 to remove the last-entered bit from the latch 58 and enter a lower-significance bit. This is the well-known successive approximation method of analogue-to-digital conversion, the complete process taking less than 1 millisecond and finishing when the level of the output of the converter 40 approximately equals the instantaneous level of the signal at the output of the Butterworth filter 36. At this point the latch 58 contains a 6-bit digitised sample of the instantaneous level of the signal at the output of the Butterworth filter 36. This digitised samples is entered into a first-in, first-out (FIFO) store 60 associated with the microprocessor 44, which store is capable of holding eight such 6-bit digitised samples.

The digitisation process is repeated every $2\frac{1}{2}$ milliseconds until the FIFO store 60 is full, at which point the store contains 8 digitised samples covering one complete half cycle of the 25 Hz component which may be present in the signal at the output of the Butterworth filter 36 (since 8×2½ milliseconds=20 milliseconds=½ the period of the 25 Hz component). However, the phase-relationship of this half cycle to the mean-level crossing points of the 25 Hz component, which mean-level crossing points are indicated at X in FIG. 2 and correspond to the end of one bit of the original digital signal and the beginning of the next bit, is not known, so the microprocessor 44 performs the aforementioned cross-correlation to determine it.

To this end, each digitised sample is successively read out of the FIFO store 60, normalised to remove the DC offset mentioned earlier, and then multiplied by a respective weighting coefficient. The weighting coefficients are selected to approximate to a positive half cycle of the aforementioned reference sine wave, and may typically have the relative values, 1, 2, 4, 4, 4, 4, 2, 1. The eight products thus formed are summed, and the modulus of the sum is entered into the first of eight accumulators 61 to 68 respectively associated with the microprocessor 44.

The whole process of digitising 8 consecutive samples of the signal at the output of the Butterworth filter 36, normalising the digitised samples and then multipying them by respective weighting coefficients, summing the products thus formed and accumulating the modulus of the sum in the first accumulator 61 is repeated until a predetermined number of consecutive samples, covering a selected number (e.g. 24) of cycles of the 25 Hz component in the signal at the output of the Butterworth filter 36, have been processed and the results accumulated in the first accumulator 61. It will be appreciated that synchronisation of the successive groups of 8 samples with successive half cycles of the 25 Hz component is assured by virtue of the fact that the 400 Hz sampling rate is phase-locked by the operation of the aforementioned phase-locked loop to the 200 kHz frequency of the carrier signal, and therefore to the bit rate of the digital signal modulating the carrier signal.

The process of normalising each group of 8 digitised samples simply comprises subtracting the running average value of the samples from each sample. The running average value is formed by averaging each group of eight samples, and then averaging a predetermined number (e.g. 16) of the most recent of the group averages. Thus as each group average is formed, it is used to replace the oldest group average of the predetermined number being used to form the running average, before the new running average is formed.

The microprocessor 44 then skips one sample, and repeats the entire digitisation/normalisation/multiplication/summation sequence described above on consecutive samples which again cover the selected number of cycles of the 25 Hz component in the signal at the output of the Butterworth filter 36, this time entering the modulus of each sum in the second accumulator 62. Since the sampling rate is phase-locked to the bit rate of the digital signal modulating the carrier signal, it will be appreciated that the step of skipping one sample is equivalent to slipping the relative phase angle between the 25 Hz component and the aforementioned reference sine wave by 360°/16=22½°. Generalizing, let N equal the number of samples produced during each half-cycle (180°). The phase difference between successive samples therefore will be 180°/N.

The entire digitisation/normalisation/multiplication/summation sequence is repeated six more times, each repetition following a respective further phase slip of 22½ , the results being accumulated in the third to eighth accmulators 63 to 68 respectively. At this point, the first to eighth accumulators 61 to 68 contain eight cross-correlation coefficients between the 25 Hz component and the reference sine wave, each corresponding to a different relative phase angle betwee the 25 Hz component of the reference sine wave.

The microprocessor 44 now determines whether the magnitude of at least one of these cross-correlation coefficients exceeds a predetermined level, indicating the presence of a 25 Hz component of sufficient amplitude for meaningful correlation. If this condition is met, the microprocessor 44 then determines which cross-correlation sufficient is the smallest, since the smallest one corresponds to a correlation between the aforementioned mean-level crossing points X of the 25 Hz component and the maximum of the reference sine wave. Having determined which cross-correlation coefficient is the smallest, the microprocessor 44 slips phase, by skipping samples, to the phase which produced that cross-correlation coefficient, and then slips phase by a further 90° (by skipping four more samples) so that the maximum of the reference sine wave is centred on the bit period of the digital signal modulating the 200 kHz carrier signal.

Each successive group of eight samples can now be regarded as likely to be representing a respective bit of the original digital signal. Each such group is accordingly entered into the FIFO store 60, the individual samples are then read out, normalised and multiplied by the aforementioned weighting coefficients, and the resulting products are summed. If the sum is positive, the group of samples is taken as representing a 1 bit, while if the sum is negative, the group of samples is taken as representing a 0 bit.

In simple terms, the successive bits thus identified are examined by the microprocessor 44 to indentify the start-of-frame code, whereupon the immediately following bi-phase data and CRC bits are decoded, checked as being valid bi-phase bits (ie not 00 or 11) and entered into two data stores (not shown) and two CRC check registers (not shown) respectively. The data in each data store is then checked in known manner against the contents of its respective CRC check register to determine its validity. If one set of the data checks as valid, it is entered into a decoder 70, where it is compared with a preset code or codes, to determine whether the data represents a message intended for the particular switching device 10 in which the receiver is incorporated. If the decoder 70 determines that the received message is indeed intended for the particular switching device 10, it produces an output signal which appropriately operates switching means 72, e.g. one or more thyristor-controlled latching relays, included in the device 10.

Figure 3A:
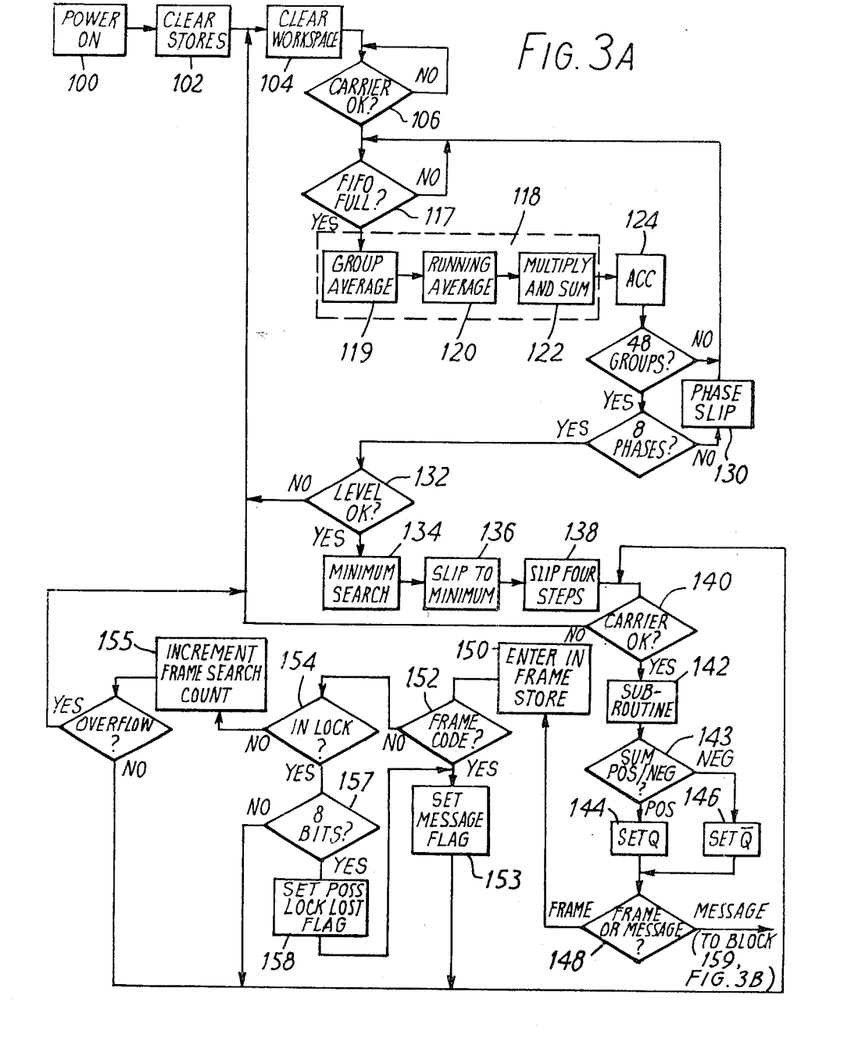
FIGS. 3A, 3B and 4 are a flow chart useful in explaining the operation of a microprocessor which forms part of the receiver of FIG. 1.
Figure 3B:
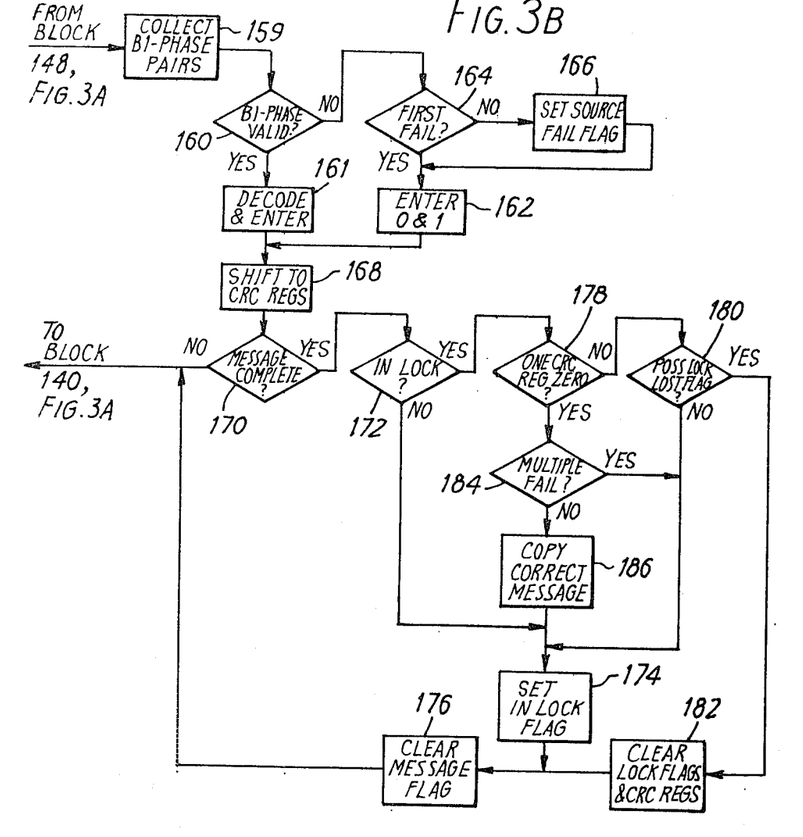

FIGS. 3A and B is a simplified flow-chart showing the way in which the microprocessor 44 of FIG. 1 is programmed to effect the sequence of operations described in relation to FIG. 1. Thus as can be seen in FIG. 3A, when the power supply to the microprocessor 44 comes on (block 100), e.g. after a power failure, the microprocessor first clears the aforementioned data stores and CRC check registers (block 102), then clears workspace in its various working stores, such as the accumulators 61 to 68 (block 104), and then repeatedly checks the signal at its input 52 to establish that the 200 kHz carrier is present (block 106).

Figure 4:
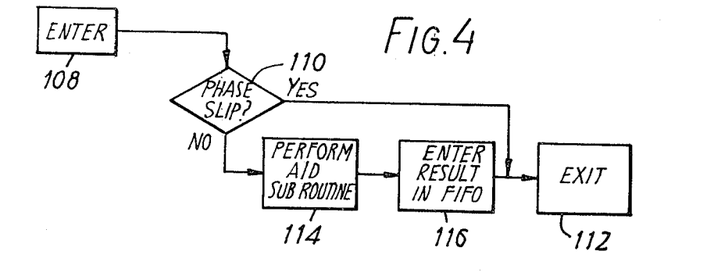

As already mentioned, the microprocessor 44 controls successive analogue-to-digital conversions of the signal at the output of the Butterworth filter 36 in response to the pulses of the 400 Hz signal applied to its interrupt input 48, i.e. as an interrupt routine. This interrupt routine is illustrated by the flow chart of FIG. 4, and is entered in response to each pulse of the 400 Hz signal (block 108). Once the routine is entered, the microprocessor 44 checks if a phase slip has been requested (block 110): if it has, the microprocessor exits from the routine immediately (block 112), but if it has not, the microprocessor initiates and controls a 6-bit successive approximation analogue-to-digital conversion cycle as described hereinbefore (block 114), enters the result in the FIFO store 60 (block 116), and then exits the routine (block 112).

Referring once more to FIG. 3A, when it is established that the 200 kHz carrier is present (block 106), the microprocessor 44 checks whether the FIFO store 60 is full (block 117). If it is, the microprocessor enters a sub-routine (block 118) in which it calculates the group average of the eight digitised samples in the FIFO store and replaces the oldest of the 16 most recent such group averages with the new one just calculated (block 119), calculates a new running average by averaging the 16 group averages (block 120), and then subtracts the new running average from each sample before weighting the samples (by multiplying them by respective ones of the aforementioned weighting coefficients) and summing them (block 122). The modulus of the weighted sum is then added into the appropriate one of the accumulators 61 to 68 (block 124) to build up a respective one of the aforementioned correlation coefficients.

The microprocessor 44 now checks whether the process of the preceding paragraph has been effected for 48 consecutive groups of 8 consecutive digitised samples (block 126): if the answer is no, block 117 is re-entered, but if the answer is yes, the microprocessor checks whether 48 such groups have been processed for all 8 different relative phase angles between the 25 Hz component in the output signal from the Butterworth filter 36 and the reference sine wave (block 128). If the answer from block 128 is no, a 22½° (or 2.5 millisecond) phase slip is requested (block 130) and block 117 is re-entered, while if the answer is yes, the microprocessor 44 effects a search to find whether the correlation coefficient in any one of the accumulators 61–68 exceeds the aforementioned predetermined level indicating meaningful correlation (block 132). If not, block 104 is re-entered, but otherwise the search identifies the phase angle corresponding to the smallest correlation coefficient (block 134), and the microprocessor then slips the phase to the identified phase angle (block 136), slips the phase a further four steps to centre on the bit period of the digital signal in the output signal from the Butterworth filter 36 (block 138), rechecks that the 200 kHz carrier is present (block 140), and enters the sub-routine defined by blocks 118, 120, 122 (block 142).

The microprocessor 44 then checks whether the weighted sum resulting from the block 142 sub-routine is positive or negative (block 143), and sets a bistable circuit to its Q or $\bar{Q}$ state accordingly (blocks 144, 146), the Q and $\bar{Q}$ states corresponding to a 1 bit and a 0 bit respectively of the digital signal. If a "message mode" flag is not set, indicating that a frame code has not yet been detected (block 148), the bits identified and set during blocks 143, 144, 146 are shifted into a frame store (block 150) and checked for the occurrence of the frame code (block 152).

When a frame code is detected in block 152, the aforementioned "message mode" flag is set (block 153), and block 140 is re-entered. However, each time a frame code is not detected in block 152, a check is made to determine if an "in lock" flag is set (block 154), and if not, the frame search count is incremented (block 155) and tested for overflow (block 156): if no overflow is detected, block 140 is re-entered to continue the search for a frame code, but if an overflow is detected, block 104 is re-entered to re-start the entire correlation process.

If the answer from block 154 is positive, indicating as will hereinafter become apparent that the eight bits of a frame code should currently be entering the frame store, and it is determined that eight bits have not yet been examined (block 157), block 140 is re-entered to continue the search for the frame-code. But if block 157 indicates that eight bits have been examined, the aforementioned "possible lock lost" flat is set (block 158) and block 153, which sets the "message mode" flag, is entered despite the failure to detect the frame code where expected.

On reaching block 148 via block 153, since the "message mode" flag is now set, indicating that a frame code has just been detected (or ought to have just been detected) in block 152, each of the next 92 bits identified and set in blocks 142, 143, 144, 146 should be part of the message represented by the 36 bi-phase data bits and 10 bi-phase CRC bits: accordingly, these bits are collected in pairs (block 159) and checked as being valid bi-phase pairs, i.e. not 0,0 or 1,1 (block 160). If valid, they are each decoded and entered into the two data stores (block 161), while if not valid, a data 0 is entered into one data store, and a data 1 is entered into the other data store (block 162), after a check has been performed to establish whether the invalid pair is the first found in that message (block 164) and a multiple fail flag has been set if the check proves negative (block 166).

The data in the data stores is then shifted into the respective CRC check registers (block 168) and the number of data bits shifted is counted to determine if the message is complete (block 170). If the message is not complete, block 140 is re-entered to collect further bits of the messge, but if the message is complete, a check whether an "in-lock" flag is set is preformed (block 172). If the result of this check is negative, the "in-lock" flag is set and a predetermined part of the message (typically the first two 6 bi-phase bit data words) is entered in an appropriate part of each of the data stores (block 174), the "message mode" flag and remaining parts of each of the data stores are cleared (block 176), and block 140 is re-entered to find the immediately subsequent frame comprising the frame code and message.

When block 172 is again reached, the "in-lock" flag is now set, so a check is performed to determine if one of the CRC check registers contains zero (block 178): this indicates that the two data words decoded from the first frame detected and the six data words decoded from the second frame detected are confirmed as correct by the 10 bi-phase CRC bits decoded from the second frame (so that each message is effectively subjected to two CRC checks). Upon a negative result from block 178, a check is effected to determine whether a "possible lock lost" flag is set (block 180), and if not, block 174 is entered: otherwise the lock flags and CRC registers are cleared (block 182), and block 176 is entered. However, upon a positive result from block 178, a check is effected to determine whether the "multiple-fail" flag is set (block 184): if it is, block 174 is entered, but otherwise, the correct message is copied into the decoder 70 (block 182), where it is decoded as described earlier in relation to FIG. 2.

Figure 5:
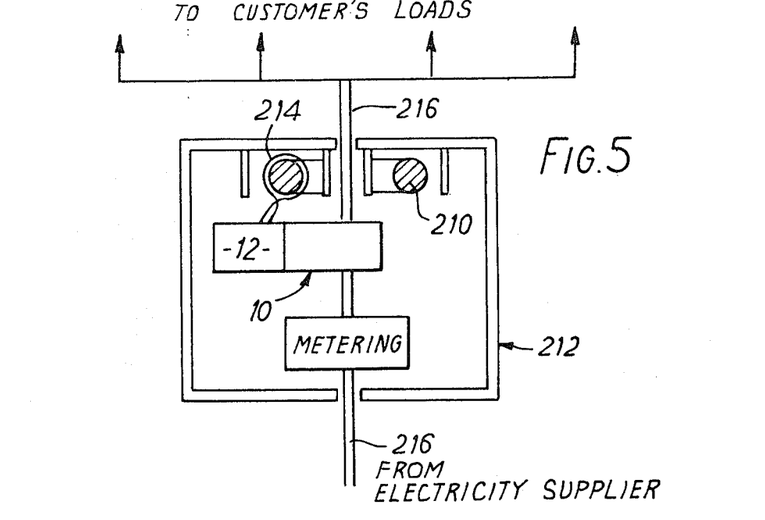
FIGS. 5 and 6 show alternative ways of implementing parts of the receiver of FIG. 1.

FIG. 5 shows an alternative way of implementing the aerial 14 of FIG. 1. In this implementation, the aerial 14 is replaced by a ferrite annulus 210, which is disposed inside an electricity meter 212 in which the switching device 10 is incorporated for tariff-switching, load-shedding or off-peak load switching purposes. A coil 214 is wound around a portion of the annulus 210, the coil being turned to 200 kHz and connected to the input of the RF amplifying stage 16 of FIG. 1: tuning the coil to 200 kHz reduces the pick-up at other frequencies, e.g. 50 Hz or 60 Hz. The annulus 210 is arranged to surround one or more wires of the A.C. power distribution circuit 216 whose power or energy consumption is being monitored by the meter 212, at the point where the wire or wires leave the meter on its down-circuit side. Thus at least a part, and optionally nearly all, of the distribution circuit 216 down-circuit of the meter 212, possibly extending all over the house or other premises in which the meter and distribution circuit are installed, serves as an aerial of the receiver 12 of the switching device 10.

The annulus 210 can be arranged on the up-circuit side of the meter 212 if desired, or can be disposed together with the switching device 10 in a separate sealed housing through which the, or part of the, distribution circuit 216 passes. Advantageously, it surrounds all three wires, i.e. live, neutral and earth, of the distribution circuit 216, in order to reduce the effect of local interference suppressors on the receiver 12.

Figure 6:
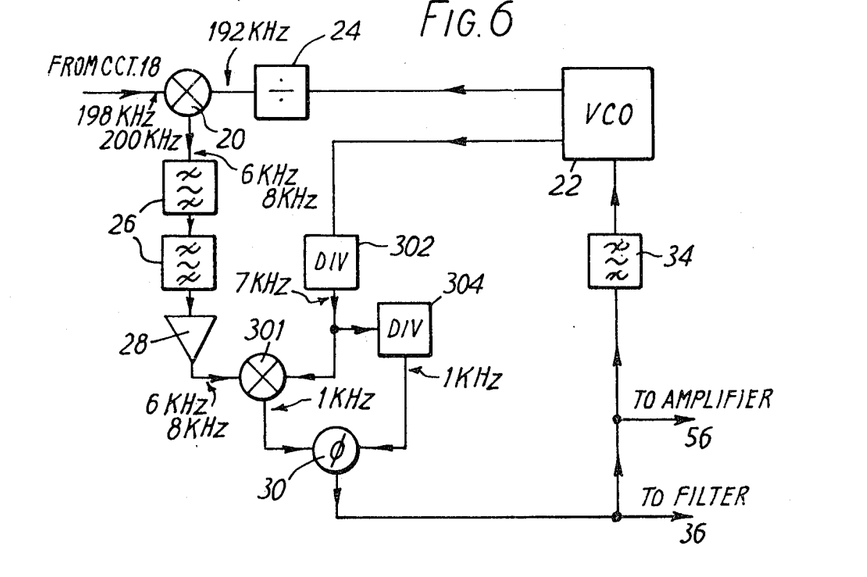

It is possible that in 1988, the current Radio 4 frequency of 200 kHz broadcast from the Droitwich transmitter will be changed to 198 kHz. FIG. 6 illustrates a modification which can be made to the circuit of FIG. 1 to ensure that the receiver 12 can satisfactorily receive both frequencies, so that switches installed before 1988 for operation with the 200 kHz carrier frequency can continue to be used after the frequency change. Elements of FIG. 6 corresponding to elements of FIG. 1 have been given the same references as were used in FIG. 1.

Thus the tuning of the aerial 14, the RF amplifying stage 16 and the tuned circuits 17 and 18 of FIG. 1 are modified to enable them to handle signals at both 198 kHz and 200 kHz, so that signals of either of these two frequencies will be applied to the mixer 20. The intermediate signal produced by the mixer 20 will therefore have a frequency of either 6 kHz or 8 kHz, depending on the frequency of the received broadcast signal.

After amplification in the 1F amplifier 26, whose bandwidth is suitably modified to handle both 6 kHz and 8 kHz signals, followed by squaring in the slicer 28, the intermediate signal is applied to one input of another mixer 301, which has a second input connected to receive a 7 kHz signal derived from the oscillator 22 via an appropriate frequency divider 302. The mixer 301 thus produces a second intermediate signal, whose frequency, because 8 kHz−7 kHz=|6 kHz−7 kHz|=1 kHz, is 1 kHz irrespective of whether the frequency of the received broadcast signal is 198 kHz or 200 kHz.

The second intermediate signal is applied to one input of the phase detector 30, whose other input is now connected to receive a 1 kHz signal derived from the oscillator 22 via another frequency divider 304. It will be appreciated that the frequency of the oscillator 22 can readily be selected to be an integral multiple of 192 kHz and 7 kHz, while still permitting a frequency suitable for use as the clock frequency of the microprocessor to be obtained. Alternatively, the 7 kHz signal can be produced using a 7 kHz voltage-controlled oscillator, whose output is frequency-divided by seven and then locked by means of an auxiliary phase-locked loop to a 1 kHz signal derived directly from the 192 kHz signal by frequency division. The 400 Hz synchronising signal required for the correlation process can be derived from the 192 kHz signal produced by the frequency divider 24.

If desired, the 1F amplifier 26 can be tuned to 8 kHz, so that the slicer 28 and mixer 301 predominantly handle the 8 kHz signals from the mixer 20, and a further 1F amplifier, tuned to 6 kHz, can be connected to the output of the mixer 20 to handle the 6 kHz signals. The output of this further 1F amplifier is applied via another slicer to another mixer, in which it is mixed with the 7 kHz signal from the frequency divider 302 to produce a further 1 kHz intermediate signal. This further 1 kHz intermediate is then appropriately combined with the 1 kHz intermediate signal at the output of the mixer 301, e.g. in an OR gate or by a wired-OR connection.

Many other modifications can be made to the described embodiment of the invention.

For example, since the bit rate of the digital signal is locked to the 200 kHz Radio 4 carrier frequency, which is extremely stable, it is itself particularly stable: accordingly, 400 Hz signal from which the aforementioned 25 Hz reference sine wave used in the correlation process is derived need not be locked to the 200 kHz carrier, but can instead be derived from a stable frequency source such as a crystal. In this case, the correlation process used to determine the mean-level crossing points X of the 25 Hz component in the signal at the output of the Butterworth filter 36 is effected continuously and repeatedly, while the correlation process used to determine bit values is simultaneously effected as a function of the most recent determination of the mean-level crossing points. To perform these simultaneous correlation processes, either a more powerful (e.g. faster) microprocessor, or two microprocessors, can be used.

If desired, an analogue correlation process can be used to determine the above-mentioned mean-level crossing points. In this case, the microprocessor can be arranged to produce the aforementioned reference sine wave by applying the weighting coefficients to a digital-to-analogue converter in response to successive pulses of the 400 Hz synchronising signal, the correlation proper being effected by an analogue multiplier whose output is coupled, for example, to an analogue integrator. As before, relative phase slip between the reference signal and the 25 Hz component in the output signal from the Butterworth filter 36 is achieved by skipping pulses of the 400 Hz synchronising signal.

Finally, although the described embodiment of the invention is adapted to receive radio broadcast signals, it can also be arranged, with little or no modification beyond that described in relation to FIG. 5, to receive mains-borne signals, that is signals transmitted over an electrical power distribution network. Such mains-borne signals, which again comprise a carrier signal (still preferably a radio frequency carrier signal) modulated with a digital signal, are transmitted over the power distribution network by suitably modulating them onto the supply voltage of the network. To receive the signals, the annulus 210 of FIG. 5 would in practice be arranged to surround just one of the wires of the network. A transmitter for producing such mains-borne signals, and a transmission system including such a transmitter and one or more receivers as hereinbefore described, forms the subject of copending U.S. patent application Ser. No. 235,277 filed Feb. 17, 1981 and assigned to the assignee of the present application. As described in Ser. No. 235,277, two carrier signals of different frequency are transmitted, either simultaneously or consecutively. It will be appreciated that the circuitry of FIG. 6 is particularly suitable for handling such carrier signals; in the case where the carrier signals are transmitted simultaneously, the respective identical digital signals modulating them are effectively summed, and thus reinforce each other.

What is claimed is:

1. A receiver for receiving a signal comprising a radio frequency carrier signal of frequency $f_1$ modulated with a digital signal of known, relatively low, bit rate, the receiver comprising:

an input circuit for receiving the modulated carrier signal;

demodulator means connected to receive and demodulate the signal received by the input circuit, so as to produce an output signal which contains said digital signal;

local oscillator means for producing a series of N reference signals whose frequency is half said known bit rate, each successive signal in the series having a different phase difference with respect to the first signal of the series; and correlator means for correlating each reference signal with the output signal produced by the demodulator means including means for identifying which of said reference signals is most nearly in phase with the bits of the digital signal, and for determining the values of successive bits of the digital signal by correlating the reference signal thus identified with said output signal.

2. A receiver is claimed in claim 1, wherein the local oscillator means includes means for producing each successive reference signal with a phase difference of substantially 180°/N with respect to the preceding one.

3. A receiver as claimed in claim 1, wherein the local oscillator means comprises means for producing a synchronising signal whose frequency is N times said known bit rate, and means for deriving each of said reference signals from said synchronising signal.

4. A receiver as claimed in claim 3, wherein the means for deriving said reference signals produces them in digital form, with each reference signal comprising, for each cycle thereof, a plurality of digital representations of its amplitude, and wherein the correlator means comprises analogue-to-digital converter means arranged to convert the output signal produced by the demodulator means into a corresponding digital signal and a digital correlator for effecting said correlations.

5. A receiver as claimed in claim 4, wherein the local oscillator means comprises means for producing a synchronising signal whose frequency is N times said known bit rate, and means for deriving each of said reference signals from said synchronising signal, and wherein the analogue-to-digital converter means is responsive to the synchronising signal to form successive digitised samples of the output signal produced by the demodulator means, and the digital correlator includes means for correlating a plurality of in-phase groups of N successive digitised samples with each of said reference signals and for identifying which contiguous groups of N samples most likely correspond to the bits of the digital signal, the digital correlator further including means for determining from the groups of samples thus identified the values of the bits represented thereby.

6. A receiver as claimed in claim 5, wherein the digital correlator includes means for subtracting from each digitised sample the mean value of a plurality of the most recent samples to form respective normalised samples.

7. A receiver as claimed in claim 6, wherein the digital correlator includes means for multiplying the N normalised samples of each of said plurality of in-phase groups by respective ones of N weighting coefficients approximating to a half cycle of a sine wave, and means for summing the N products formed for each group to form respective group products.

8. A receiver as claimed in claim 7, wherein the digital correlator includes means for summing the moduli of the group products formed for each plurality of in-phase groups so as to form a respective phase comparison coefficient for each of said reference signals, and for determining which plurality of in-phase groups has the lowest value of resulting comparison coefficient and therefore represents the groups most nearly 90° out of phase with the contiguous groups most likely to correspond to the bits of the digital signal.

9. A receiver as claimed in claim 8, wherein the digital correlator further includes means for determining whether the value of any one of said comparison coefficients exceeds a predetermined value and for indicating the likely presence of the digital signal at a detectable level in the output signal produced by the demodulator means.

10. A receiver as claimed in claim 7, wherein the digital correlator includes means for determining the values of the bits of the digital signal comprising: means for multiplying the N successive normalised samples of each successive group identified as being most likely to correspond to a bit of the digital signal by the respective ones of said weighting coefficients; means for summing the N products formed for each group to form a respective group product; and means for determining the value of the bit represented by each group from the polarity of the resulting group product.

11. A receiver as claimed in claim 5, wherein the digital correlator includes a microprocessor which also forms part of said analogue-to-digital converter means and which has an interrupt input connected to receive the synchronising signal, the microprocessor controlling the production of said samples in response to the synchronising signal as an interrupt routine.

12. A receiver as claimed in claim 5, wherein the digital correlator includes means for performing said group identification repeatedly, and for simultaneously performing said bit value determination as a function of the most recent group identification.

13. A receiver as claimed in claim 1, wherein said correlator means includes means for performing said correlations successively.

14. A receiver as claimed in claim 1, for use when the bit rate of the digital signal has a known, substantially fixed, relationship with the frequency $f_1$ of the carrier signal, wherein the local oscillator means comprises:

a variable-frequency oscillator having an operating frequency $f_2$;

phase-lock means responsive to the carrier signal received by the input circuit to lock the frequency $f_2$ of the variable-frequency oscillator into a predetermined frequency relationship with the frequency $f_1$; and means for deriving the reference signals from the variable-frequency oscillator.

15. A receiver as claimed in claim 14, wherein the phase-lock means comprises:
a mixer circuit responsive to the signal received by the input circuit and the signal of frequency $f_2$ to produce an intermediate signal of frequency $|f_1-f_2|$;

frequency divider means responsive to a signal produced by the variable-frequency oscillator to produce a frequency-divided signal of frequency $f_3$;

phase detector means responsive to the intermediate signal and the frequency-divided signal to produce said output signal, said output signal including a DC component dependent upon the phase difference between said intermediate and frequency-divided signals; and low-pass filter means responsive to said output signal for substantially attenuating said digital signal while applying said DC component to said variable-frequency oscillator to vary the frequency thereof in the sense which tends to reduce said phase difference, and thus tends to reduce the frequency difference between said intermediate and frequency-divided signals.

16. A method of receiving a radio frequency carrier signal of frequency $f_1$ modulated with a digital signal of known, relatively low, bit rate, comprising the steps of:
(a) receiving the modulated carrier signal;
(b) demodulating the received modulated carrier signal so as to produce an output signal which contains said digital signal;
(c) producing a series of N reference signals whose frequency is half said known bit rate, each successive signal in the series having a different phase difference with respect to the first signal of the series; and
(d) correlating each reference signal produced in step (c) with the output signal produced in step (b) so as to identify which of said reference signals is most nearly in phase with the bits of the digital signal, and determining the values of successive bits of the digital signal by correlating the reference signal thus identified with said output signal.

17. The method of claim 16, wherein in step (c) each successive reference signal is produced having a phase difference of substantially 180°/N with respect to the preceding one.

18. The method of claim 16, wherein step (c) comprises the steps of producing a synchronising signal whose frequency is N times said known bit rate, and deriving each of said reference signals from said synchronising signal.

19. The method of claim 16, wherein the step of deriving said reference signals includes producing the reference signals in digital form, with each reference signal comprising, for each cycle thereof, a plurality of digital representations of its amplitude, and wherein step (d) includes the steps of converting the output signal produced by the demodulator means into a corresponding digital signal and performing said correlations digitally.

20. The method of claim 19, wherein step (c) comprises the steps of producing a synchronising signal whose frequency is N times said known bit rate, and deriving each of said reference signals from said synchronising signal, and wherein the step of converting the output signal to a digital signal is performed in response to the synchronising signal and includes the step of forming successive digitised samples of the output signal produced during step (b), and wherein step (d) includes the steps of correlating a plurality of in-phase groups of N successive digitised samples with each of said reference signals so as to identify which contiguous groups of N samples most likely correspond to the bits of the digital signal, and determining from the groups of samples thus identified the values of the bits represented thereby.

21. The method of claim 20, wherein in step (d) said correlations are commenced by subtracting from each digitised sample the mean value of a plurality of the most recent samples, to form respective normalised samples.

22. The method of claim 21, wherein in step (d) the correlations with the reference signals are continued by multiplying the N normalised samples of each of said plurality of in-phase groups by respective ones of N weighting coefficients approximating to a half cycle of a sine wave, and by summing the N products formed for each group to form respective group products.

23. The method of claim 22, wherein in step (d) said correlations with the reference signals are completed by summing the moduli of the group products formed for each plurality of in-phase groups so as to form a respective phase comparison coefficient for each of said reference signals, and by determining which plurality of in-phase groups has the lowest value of resulting comparison coefficient and therefore represents the groups most nearly 90° out of phase with the contiguous groups most likely to correspond to the bits of the digital signal.

24. The method of claim 23, wherein step (d) further includes the step of determining whether the value of any one of said comparison coefficients exceeds a predetermined value which indicates the likely presence of the digital signal at a detectable level in the output signal produced by step (b).

25. The method of claim 22, wherein step (d) includes the steps of determining the values of the bits of the digital signal by multiplying the N successive normalised samples of each successive group identified as being most likely to correspond to a bit of the digital signal by the respective ones of said weighting coefficients, summing the N products formed for each group to form a respective group product, and determining the value of the bit represented by each group from the polarity of the resulting group product.

26. The method of claim 20, wherein in step (d) said group identification step is performed repeatedly, while simultaneously said bit value is determined as a function of the most recent group identification.

27. The method of claim 16, wherein in step (d) said correlations are performed successively.

28. The method of claim 16, for use when the bit rate of the digital signal has a known, substantially fixed, relationship with the frequency $f_1$ of the carrier signal, wherein step (c) comprises the steps of generating a variable-frequency signal having an operating frequency $f_2$, locking the frequency $f_2$ of the variable-frequency signal into a predetermined frequency relationship with the frequency $f_1$ in response to the carrier signal received by the input circuit, and deriving the reference signals from the variable-frequency signal.

29. The method of claim 28, wherein said locking step comprises the steps of: producing in response to the signal received by the input circuit and the signal of frequency $f_2$ an intermediate signal of frequency $|f_1-f_2|$; producing in response to a signal produced by the variable-frequency oscillator a frequency-divided signal of frequency $f_3$; producing said output signal in response to the intermediate signal and the frequency-divided signal, said output signal including a DC component dependent upon the phase difference between said intermediate and frequency-divided signals; and substantially attenuating said digital signal in response to said output signal while applying said DC component to said variable-frequency signal to vary the frequency thereof in the sense which tends to reduce said phase difference, and thus tends to reduce the frequency difference between said intermediate and frequency-divided signals.

* * * * *